(12) United States Patent
Small

(10) Patent No.: US 9,783,340 B2
(45) Date of Patent: Oct. 10, 2017

(54) RAINWATER COLLECTION AND DISTRIBUTION SYSTEM

(71) Applicant: Nicole Andrea Small, Framingham, MA (US)

(72) Inventor: Nicole Andrea Small, Framingham, MA (US)

(*) Notice: Subject to any disclaimer, the term of this patent is extended or adjusted under 35 U.S.C. 154(b) by 0 days.

(21) Appl. No.: 14/830,642

(22) Filed: Aug. 19, 2015

(65) Prior Publication Data

US 2016/0053467 A1  Feb. 25, 2016

Related U.S. Application Data

(60) Provisional application No. 62/038,929, filed on Aug. 19, 2014.

(51) Int. Cl.
*B65D 25/42* (2006.01)
*B65D 25/28* (2006.01)
*A01G 25/14* (2006.01)
*E03B 3/03* (2006.01)

(52) U.S. Cl.
CPC ......... *B65D 25/2867* (2013.01); *A01G 25/14* (2013.01); *E03B 3/03* (2013.01)

(58) Field of Classification Search
CPC ........ A01G 25/14; B65D 25/2867; E03B 3/03
See application file for complete search history.

(56) References Cited

U.S. PATENT DOCUMENTS

| | | | | |
|---|---|---|---|---|
| 4,114,644 A | * | 9/1978 | Piper | B60K 11/00 137/355.16 |
| 4,301,841 A | * | 11/1981 | Sandow | B65D 23/10 141/326 |
| 4,488,584 A | * | 12/1984 | Hestehave | B65D 25/20 141/331 |
| 2009/0261109 A1 | * | 10/2009 | Mirza | F16N 31/004 220/571 |
| 2011/0042385 A1 | * | 2/2011 | Treslo | F16N 31/004 220/571 |
| 2016/0053467 A1 | * | 2/2016 | Small | B65D 25/2867 222/465.1 |

* cited by examiner

*Primary Examiner* — Frederick C Nicolas
*Assistant Examiner* — Bob Zadeh
(74) *Attorney, Agent, or Firm* — Dunlap Bennett & Ludwig PLLC

(57) ABSTRACT

A rainwater collection and distribution system embodying a rain collector apparatus for collecting rainwater in an easy to transport tank is provided, wherein the apparatus is adapted to direct excessive rainwater as well as relocate and distribute rainwater stored in the tank. The rain collector may form an internal cavity for receiving rainwater. A recessed operative surface along an upper portion of the rain collector may form a plurality of apertures for receiving and communicating the rainwater into the internal cavity. The operative surface may be sloped so that rainwater in excess of the capacity of the internal cavity is directed along the slope to a predetermined location. The rain collector may form a handle and a pour spout, whereby a user may transport the rainwater stored in the internal cavity and pour stored rainwater through the pour spout for a desired reuse activity.

7 Claims, 4 Drawing Sheets

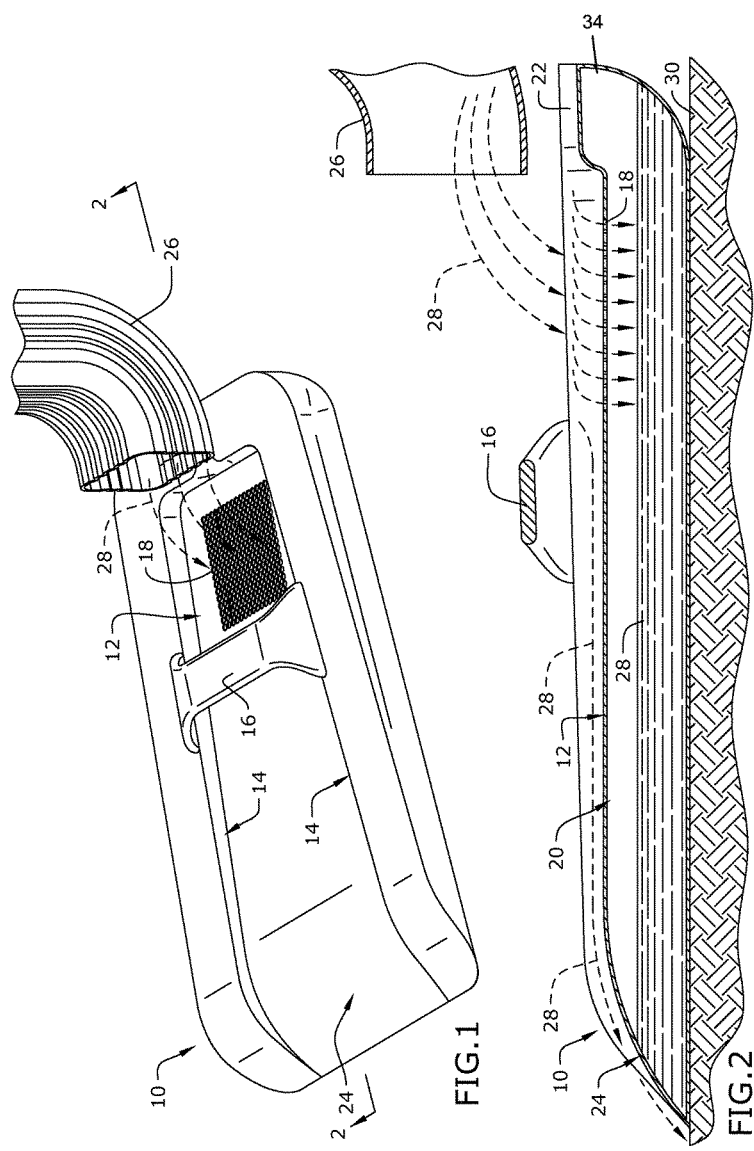

RAINWATER COLLECTION AND DISTRIBUTION SYSTEM

CROSS-REFERENCE TO RELATED APPLICATION

This application claims the benefit of priority of U.S. provisional application No. 62/038,929, filed 19 Aug. 2014, the contents of which are herein incorporated by reference.

BACKGROUND OF THE INVENTION

The present invention relates to water collection systems and, more particularly, to a rainwater collection and distribution system embodying an apparatus for collecting rainwater in an easy to transport tank, wherein the apparatus is adapted to direct the distribution of excessive and reuse the collected rainwater.

Rain that lands on the roof of a house or building typically gets collected in a gutter system and funneled to downspouts, where it flows down and out, eventually spilling out on to the ground, unable to be used, and possibly causing damage to the foundation of said house or building. Rain barrel or buckets placed underneath a downspout collect a large and very heavy volume of water. However, when a barrel or bucket of water is full, additional water runoff is not a purposefully directed to a predetermined location, causing water to possibly seep down into soil close to the house and into house foundation. And because a large volume of water is very heavy (1 gallon=8.35 lbs), once collected, such means are very difficult to move to another location for reuse of the collected water. Alternatively, splash-blocks known in the art to direct water away from the house's foundation, do not enable to collection of the rainwater or transport thereof for reuse.

As can be seen, there is a need for an apparatus for collecting rainwater in an easy to transport receptacle, wherein the apparatus is adapted to direct the flow of excessive rainwater and reuse the collected water.

SUMMARY OF THE INVENTION

In one aspect of the present invention, a rain collector for collecting a portion of a fluid from a fluid source, directing a remaining portion of the fluid, and enabling the reuse of the collected portion includes an elongated tank forming an internal cavity, wherein the internal cavity is defined by a first end wall, a second end wall, two opposing sidewalls and a base wall, and wherein the sidewalls and the base wall extend between the end walls; an operative surface extending between the two opposing sidewalls and the end walls; and a plurality of apertures formed in the operative surface near the first end wall, wherein the plurality of apertures fluidly communicate with the internal cavity, wherein the operative surface is recessed relative to the two opposing sidewalls and the first end wall.

In another aspect of the present invention, the rain collector includes an elongated tank forming an internal cavity, wherein the internal cavity is defined by a first end wall, a second end wall, two opposing sidewalls and a base wall, and wherein the sidewalls and the base wall extend between the end walls; an operative surface extending between the two opposing sidewalls and the end walls; and a plurality of apertures formed in the operative surface near the first end wall, wherein the plurality of apertures fluidly communicate with the internal cavity; a pour spout formed by the first end wall; a handle extending between the two sidewalls; and a ramp formed by the second end wall, wherein the operative surface is recessed relative to the two opposing sidewalls and the first end wall, wherein the operative surface is substantially flush with a peripheral edge of the second end wall, and wherein the operative surface slopes toward the base wall as it extends from the first end wall.

These and other features, aspects and advantages of the present invention will become better understood with reference to the following drawings, description and claims.

BRIEF DESCRIPTION OF THE DRAWINGS

FIG. 1 is a perspective detail view of an exemplary embodiment of the present invention, shown in use;

FIG. 2 is a section detail view of an exemplary embodiment of the present invention, taken along line 2-2 of FIG. 1;

DETAILED DESCRIPTION OF THE INVENTION

Figure 3:
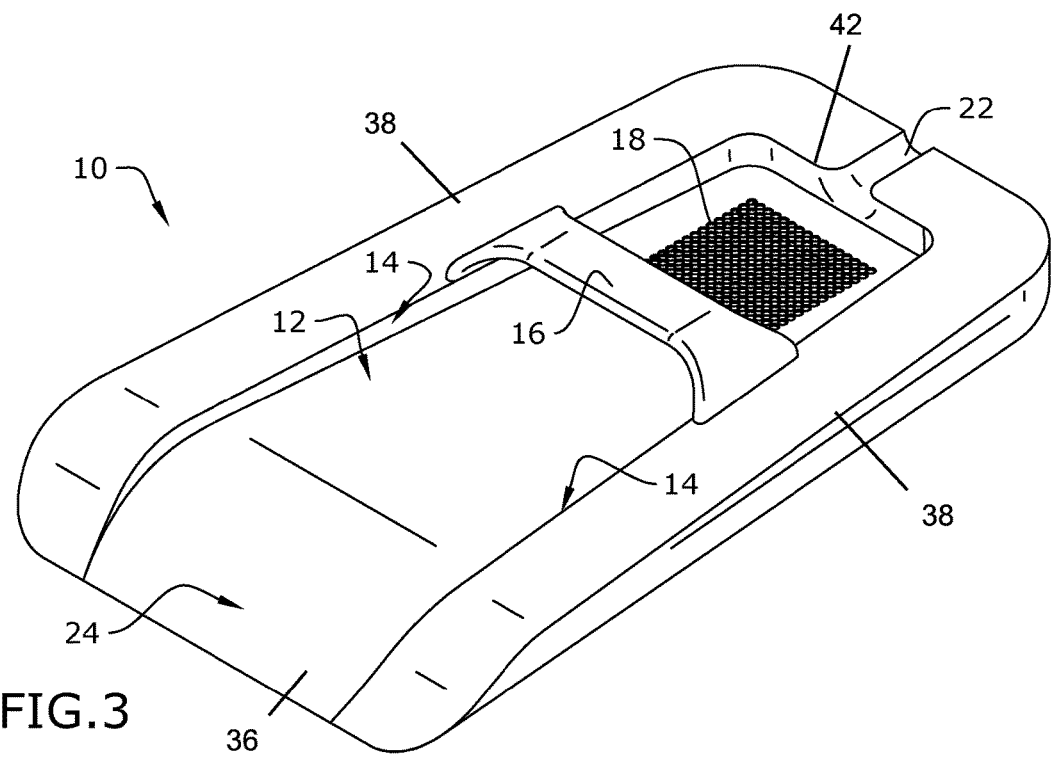
FIG. 3 is a top perspective view of an exemplary embodiment of the present invention
Figure 4:
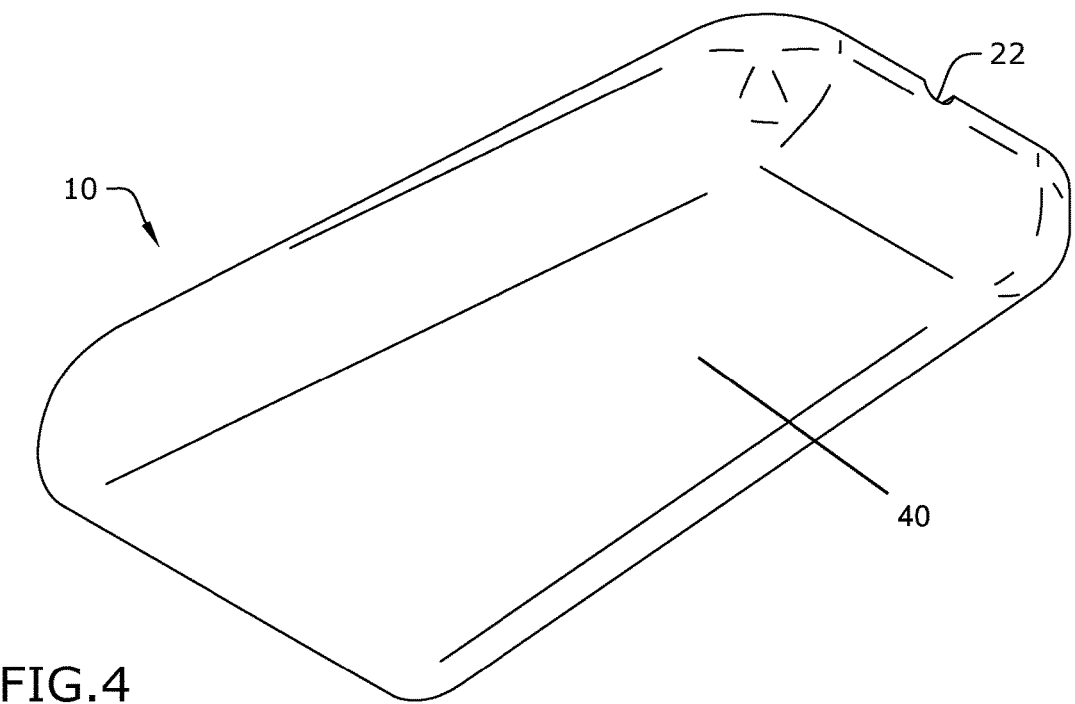
FIG. 4 is a bottom perspective view of an exemplary embodiment of the present invention.
Figure 5:
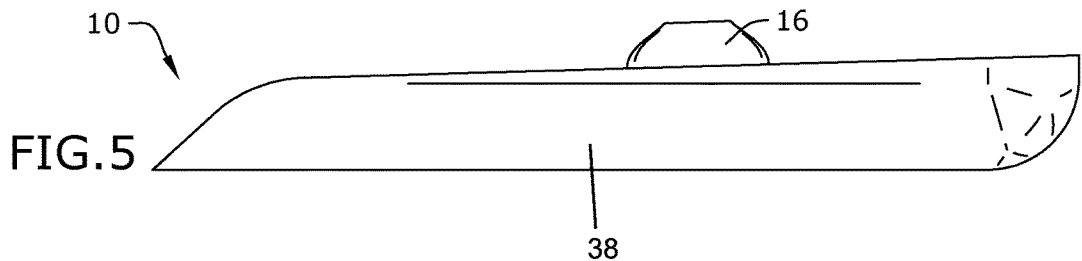
FIG. 5 is a side view of an exemplary embodiment of the present invention.
Figure 6:
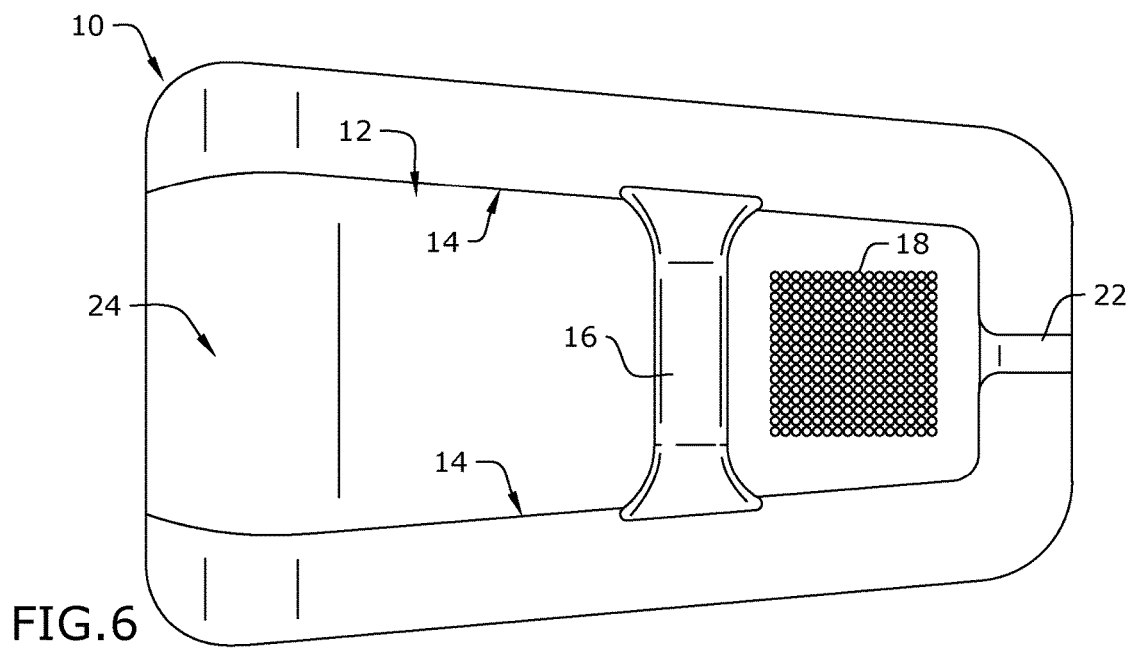
FIG. 6 is a top view of an exemplary embodiment of the present invention.
Figure 7:
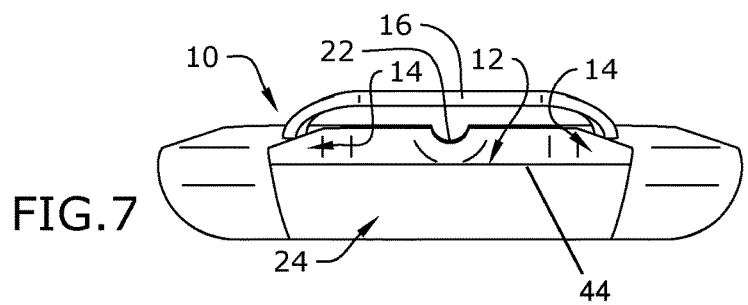
FIG. 7 is a front view of an exemplary embodiment of the present invention.
Figure 8:
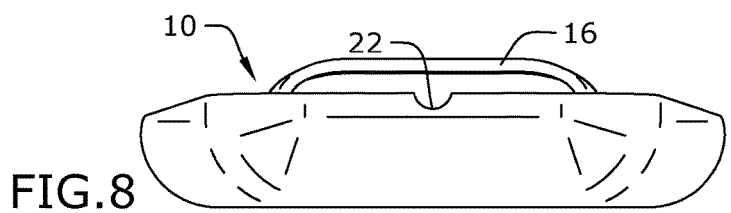
FIG. 8 is a back view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a rainwater collection and distribution system embodying a rain collector apparatus for collecting rainwater in an easy to transport tank, wherein the apparatus is adapted to direct excessive rainwater as well as relocate and distribute rainwater stored in the tank. The rain collector may form an internal cavity for receiving rainwater. A recessed operative surface along an upper portion of the rain collector may form a plurality of apertures for receiving and communicating the rainwater into the internal cavity. The operative surface may be sloped so that rainwater in excess of the capacity of the internal cavity is directed along the slope to a predetermined location. The rain collector may form a handle and a pour spout, whereby a user may transport the rainwater stored in the internal cavity and pour stored rainwater through the pour spout for a desired reuse activity.

Referring to FIGS. 1 through 9, the present invention may include a system for collecting and distributing rainwater that embodies a rain collector 10. The rain collector 10 may include an elongated tank extending from a first end wall 34 to a second end wall 36, wherein the elongated tank forms an internal cavity 20 for receiving a fluid 28, such as rainwater. The internal cavity 20 may be enclosed by the joining of the end walls, two opposing sidewalls 38, a base wall 40 and an operative surface 12 opposite the base wall 40, wherein the operative surface 12 extends between the end walls 34, 36 and two opposing sidewalls 38, as illustrated in the Figures. Note, as long as the base wall 40 is dimensioned and adapted to support the rain collector 10 on a supporting surface 30, the elongated tank may be any geometric or non-geometric shape as long as it functions in accordance with the present invention disclosed herein.

The operative surface 12 may form a plurality of apertures 18 fluidly communicating to the internal cavity 20. In certain embodiments, the plurality of apertures 18 may be formed in a screen that is a separate, connected component of the present invention. The plurality of apertures 18 may be disposed near the first end wall 34.

The operative surface 12 may form a slope slanting toward from the base wall 40 as the operative surface 12 extends from the first end wall 34 to the second end wall 36. Note, if the base wall 40 were resting on the supporting surface 30, such as the ground, said slope would be deemed 'downward' as it extends from the first end wall 34. The operative surface 12 may interface with the first end wall 34 inward from its peripheral edge 42, wherein said peripheral edge 42 being the farthest portion of the first end wall 34 from the base wall 40. Terminating at the second end wall 36, the operative surface 12 may be substantially flush with an analogous peripheral edge 44 of the second end wall 36. Extending toward the second end wall 36, a guide wall surface 14 may be formed along the interface of the operative surface 12 and the sidewalls 38 and the first end wall 34, as illustrated in FIG. 1. In other words, the operative surface 12 may form a recessed surface between at least the two opposing sidewalls 38 and the first end wall 34.

In an alternative embodiment, the operative surface 12 may form a slope slanting away from the base wall 40 as the operative surface 12 extends from the first end wall 34 to the second end wall 36. Note, if the base wall 40 were resting on the supporting surface 30, the slope of the operative surface 12 would be deemed 'upward' as it extends from the first end wall 34.

In yet another embodiment, the operative surface 12 may be substantially parallel with the base wall 40 at least as it starts to extend from the first end wall 34.

In certain embodiments, the first end wall 34 may extend from the base wall 40 a greater distance than the second end wall 36 extends from said base wall 40 so that when the base wall 40 rests on a horizontal supporting surface 30, whereby the peripheral edge 42 of the first end wall 34 is 'higher' than the peripheral edge 44 of the second end wall 36. In such an embodiment, fluid 28 collecting on the sloped operative surface 12 would be urged to flow over the peripheral edge 44 of the second end wall 36 before overflowing the guide wall surface 14, thereby directing excessive fluid 28 to be distributed to a predetermined location near the second end wall 36.

In certain embodiments, the second end wall 36 may form a ramp 24 sloped toward the supporting surface 30. As a result, the user 32 may purposefully direct excess, say, rainwater away from the foundation of a house. In the alternative embodiment, there would be a slope transition point between the 'upward' slope of the operative surface 12 and the ramp 24, said slope transition point being inward from or at the second end wall 36.

A handle 16 may extend from one sidewall 38 to the opposing sidewall 38 of the rain collector 10. The handle 16 may be disposed along different portions of the rain collector 10 so long as it facilitates the manual handling of the rain collector 10 during transportation or subsequent reuse activities.

Figure 9:
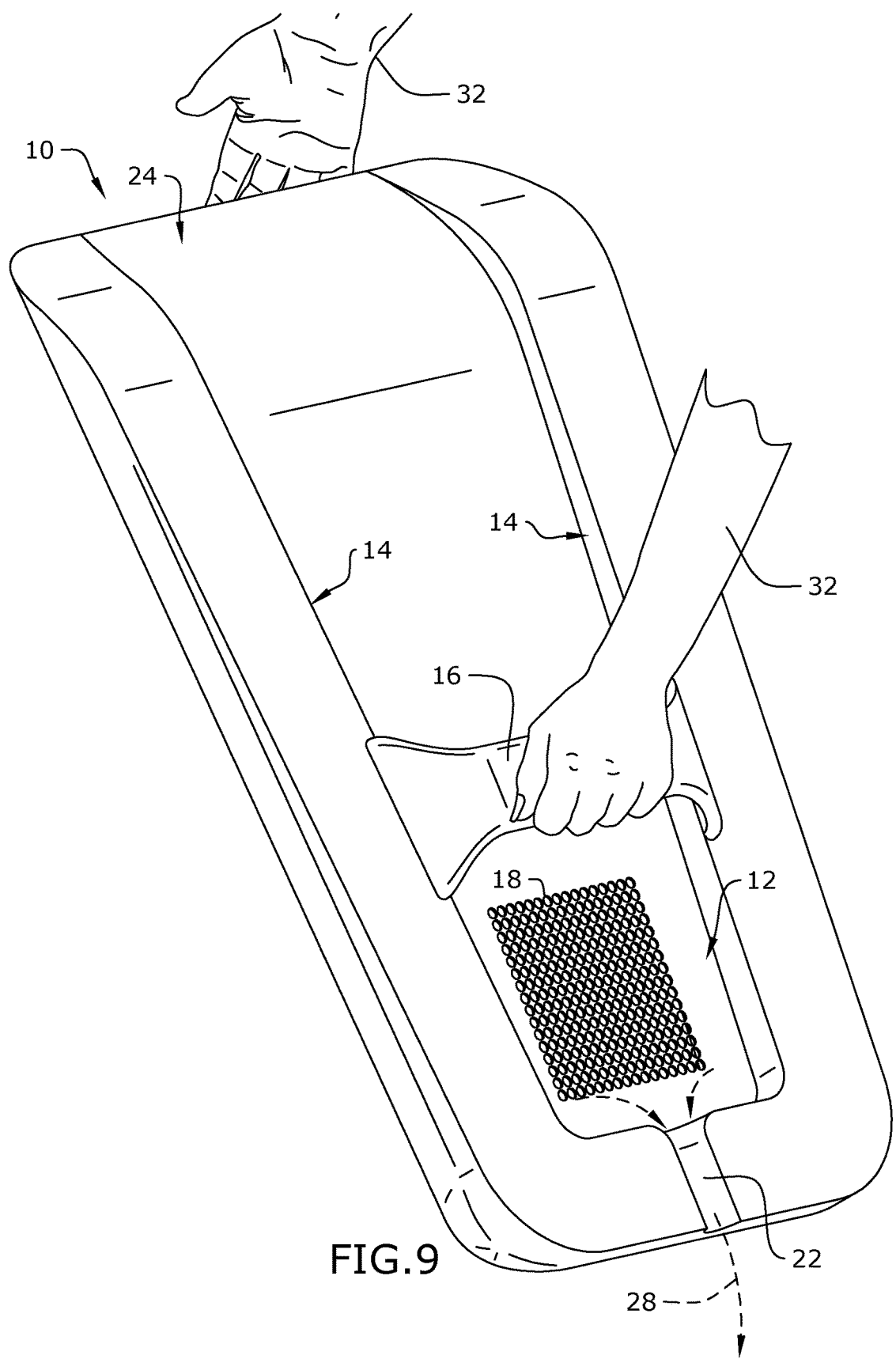
FIG. 9 is a perspective view of an exemplary embodiment of the present invention, shown in use.

A pour spout 22 may be formed in the first end wall 34 as a cutout thereof, so that the pour spout 22 communicates with a portion of the area surrounded by the guide wall surface 14. Thereby, a user 32, possibly while manipulating the handle 16, may pour fluid 28 stored within the internal cavity 20, and gathered on the operative surface 12, through the pour spout 22 for reuse activities, as illustrated in FIG. 9.

A method of using the rain collector 10 may include the following. The system for collecting and distributing rainwater disclosed above may be provided. A user 32 may place the rain collector 10 underneath a source of fluid 26, for example a downspout 26, positioning the plurality of apertures 18 so as to substantially receive the fluid 28 flow, for example rainwater discharging from the downspout 26. In the alternative embodiment, other portions of the operative surface 12 may be positioned to substantially receive the rainwater discharge, so that its slope will gravitationally urge said discharge onto and through the plurality of apertures 18. The internal cavity 20 will receive and store the rainwater until such rainwater exceeds its capacity, whereby the excess rainwater will puddle and gather on the operative surface 12, boxed in by the guide wall surface 14 so that all additional rainwater will be gravitationally urged 'down' the sloped operative surface 12 over the peripheral edge 44 and/or ramp 24 of the second end wall 36 toward the predetermined portion of the supporting surface 30.

Then the user 32 may grab the handle 16 and transport the rain collector 10 to a desired location to pour the rainwater from the internal cavity 20, through the pour spout 22, for a desired reuse activity, such as watering plants or the like.

It should be understood, of course, that the foregoing relates to exemplary embodiments of the invention and that modifications may be made without departing from the spirit and scope of the invention as set forth in the following claims.

What is claimed is:

1. A rain collector, comprising:
an elongated tank forming an internal cavity, wherein the internal cavity is defined by a first end wall, a second end wall, two opposing sidewalls and a base wall, and wherein the two opposing sidewalls and the base wall extend between the first and second end walls;
an operative surface extending between the two opposing sidewalls and the first and second end walls;
a plurality of apertures formed in the operative surface near the first end wall, wherein the plurality of apertures fluidly communicates with the internal cavity, wherein the operative surface is recessed relative to the two opposing sidewalls and the first end wall; and
a pouring cutout recessed within the first end wall adjacent to the plurality of apertures, whereby the pouring cutout is for pouring rainwater from the internal cavity.

2. The rain collector of claim 1, wherein a distance from the base wall to a peripheral edge of the first end wall is longer than a distance from the base wall to a peripheral edge of the second end wall.

3. The rain collector of claim 1, wherein the operative surface is substantially flush with a peripheral edge of the second end wall.

4. The rain collector of claim 3, wherein the second end wall forms a ramp sloped toward the base wall.

5. The rain collector of claim 3, wherein the operative surface slopes toward the base wall as the operative surface extends from the first end wall.

6. The rain collector of claim 3, further comprising a handle extending between the two opposing sidewalls.

7. A rain collector, comprising:
an elongated tank forming an internal cavity, wherein the internal cavity is defined by a first end wall, a second end wall, two opposing sidewalls and a base wall, and wherein the two opposing sidewalls and the base wall extend between the first and second end walls;
an operative surface extending between the two opposing sidewalls and the first and second end walls;
a plurality of apertures formed in the operative surface near the first end wall, wherein the plurality of apertures fluidly communicates with the internal cavity;
a pouring cutout recessed within the first end wall adjacent to the plurality of apertures, wherein the pouring cutout is for pouring rainwater from the internal cavity;
a handle extending between the two sidewalls; and
a ramp formed by the second end wall,
wherein the operative surface is recessed relative to the two opposing sidewalls and the first end wall,
wherein the operative surface is substantially flush with a peripheral edge of the second end wall, and
wherein the operative surface slopes toward the base wall as the operative surface extends from the first end wall.

* * * * *